United States Patent
Li et al.

(10) Patent No.: US 12,553,843 B2
(45) Date of Patent: Feb. 17, 2026

(54) METHOD FOR DETECTING SERVICE LIFE OF PRE-CROSSLINKED MATERIAL FOR HIGH-VOLTAGE ALTERNATING-CURRENT CABLE INSULATION

(71) Applicants: ELECTRIC POWER RESEARCH INSTITUTE. CHINA SOUTHERN POWER GRID, Guangdong (CN); SHENZHEN POWER SUPPLY CO., LTD., Guangdong (CN)

(72) Inventors: Xiaolin Li, Guangdong (CN); Mingli Fu, Guangdong (CN); Shuai Hou, Guangdong (CN); Baojun Hui, Guangdong (CN); Wenbo Zhu, Guangdong (CN); Guoxing Wu, Guangdong (CN); Hong Xie, Guangdong (CN); Xiao Chen, Guangdong (CN); Shu Xu, Guangdong (CN); Bin Feng, Guangdong (CN); Yifan Zhang, Guangdong (CN)

(73) Assignees: ELECTRIC POWER RESEARCH INSTITUTE, CHINA SOUTHERN POWER GRID, Guangdong (CN); SHENZHEN POWER SUPPLY CO., LTD., Guangdong (CN)

( * ) Notice: Subject to any disclaimer, the term of this patent is extended or adjusted under 35 U.S.C. 154(b) by 740 days.

(21) Appl. No.: 17/912,541

(22) PCT Filed: Oct. 21, 2021

(86) PCT No.: PCT/CN2021/125231
§ 371 (c)(1),
(2) Date: Sep. 19, 2022

(87) PCT Pub. No.: WO2022/100391
PCT Pub. Date: May 19, 2022

(65) Prior Publication Data
US 2023/0134077 A1    May 4, 2023

(30) Foreign Application Priority Data

Nov. 11, 2020 (CN) .......................... 202011250164.1

(51) Int. Cl.
*G01N 25/02* (2006.01)
*G01N 17/00* (2006.01)
(Continued)

(52) U.S. Cl.
CPC ............ *G01N 25/02* (2013.01); *G01N 17/00* (2013.01); *G01N 25/20* (2013.01); *G01N 33/442* (2013.01)

(58) Field of Classification Search
CPC ........ G01N 25/02; G01N 17/00; G01N 25/20; G01N 33/442
See application file for complete search history.

(56) References Cited

U.S. PATENT DOCUMENTS 4,770,542 A * 9/1988 Takagi ................. G01N 17/004
374/57
4,988,875 A * 1/1991 Ortiz .................... G01N 21/952
250/559.46
(Continued)

FOREIGN PATENT DOCUMENTS

CN    104793111 A    7/2015
CN    105158085 A    12/2015
(Continued)

OTHER PUBLICATIONS

International Search Report for PCT/CN2021/125231 mailed Jan. 19, 2022, ISA/CN.
(Continued)

*Primary Examiner* — Laura Martin
*Assistant Examiner* — Philip L Cotey
(74) *Attorney, Agent, or Firm* — Yue (Robert) Xu; Apex Attorneys at Law, LLP

(57) ABSTRACT

A method for detecting a storage life of a pre-crosslinked material is provided. Tableting is performed on an unaged
(Continued)

pre-crosslinked material to obtain crosslinked polyethylene. A crosslinking degree and a mechanical property of the crosslinked polyethylene are measured to obtain reference data. The pre-crosslinked material is heated to obtain a fast-aged pre-crosslinked material. The crosslinking degree and mechanical property of crosslinked polyethylene obtained from the fast-aged pre-crosslinked material are measured to obtain measurement results, which are compared with the reference data. If comparison results all fall within corresponding ranges, the time period of heating is increased by a step to repeat the above steps until the comparison results do not all fall within the corresponding ranges. A result obtained by subtracting the step from the time period of heating is converted into a time period of storage at the room temperature.

6 Claims, 1 Drawing Sheet

(51) Int. Cl.
*G01N 25/20* (2006.01)
*G01N 33/44* (2006.01)

(56) References Cited

U.S. PATENT DOCUMENTS

| | | | | |
|---|---|---|---|---|
| 5,241,184 A * | 8/1993 | Menzel | ............ | G01N 21/64 250/459.1 |
| 5,572,115 A * | 11/1996 | Strong | ............ | G01N 33/32 324/705 |
| 6,076,411 A * | 6/2000 | Horvath | ............ | G01N 21/88 73/866 |
| 8,668,382 B2 * | 3/2014 | Honbo | ............ | H01B 3/30 374/57 |
| 10,317,349 B2 * | 6/2019 | Engel | ............ | G01N 23/203 |
| 2008/0307909 A1 * | 12/2008 | Watkins, Jr. | ............ | G01R 31/1227 73/866 |
| 2012/0085155 A1 * | 4/2012 | Guerout | ............ | G01N 3/42 73/82 |
| 2013/0000947 A1 * | 1/2013 | Smedberg | ............ | C08K 5/14 525/332.8 |
| 2017/0153188 A1 * | 6/2017 | Engel | ............ | G01N 23/203 |
| 2022/0034831 A1 * | 2/2022 | Kim | ............ | G01N 25/20 |
| 2022/0283065 A1 * | 9/2022 | Sachdev | ............ | G01N 3/42 |

FOREIGN PATENT DOCUMENTS

| | | |
|---|---|---|
| CN | 105866015 A | 8/2016 |
| CN | 108828416 A | 11/2018 |
| CN | 109917251 A | 6/2019 |
| CN | 110186513 A | 8/2019 |
| CN | 111337418 A | 6/2020 |
| CN | 111366459 A | 7/2020 |
| CN | 112557438 A | 3/2021 |
| WO | 2014197550 A1 | 12/2014 |

OTHER PUBLICATIONS

Xiao Taoyun, et al., Test method for cross-linking degree of ethylene-vinyl acetate copolymer applied in photovoltaic modules-Differential scanning calorimetry (DSC), GB/T 36965—2018, Apr. 1, 2019.

* cited by examiner

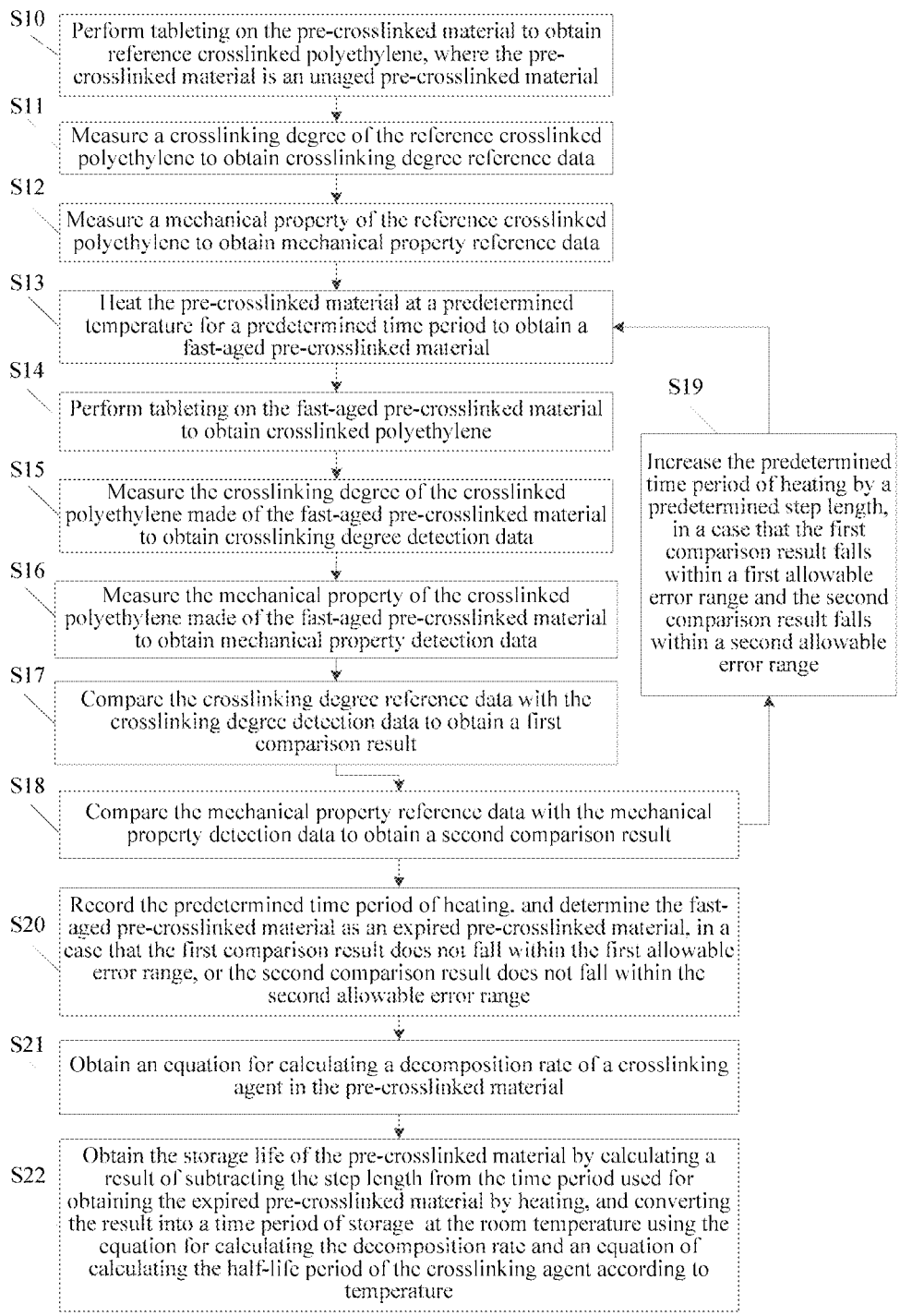

METHOD FOR DETECTING SERVICE LIFE OF PRE-CROSSLINKED MATERIAL FOR HIGH-VOLTAGE ALTERNATING-CURRENT CABLE INSULATION

This application is the national phase of International Patent Application No. PCT/CN2021/125231, titled "METHOD FOR DETECTING SERVICE LIFE OF PRE-CROSSLINKED MATERIAL FOR HIGH-VOLTAGE ALTERNATING-CURRENT CABLE INSULATION", filed on Oct. 21, 2021, which claims the priority to Chinese Patent Application No. 202011250164.1, titled "METHOD FOR DETECTING SERVICE LIFE OF PRE-CROSSLINKED MATERIAL FOR HIGH-VOLTAGE ALTERNATING-CURRENT CABLE INSULATION", filed on Nov. 11, 2020 with the Chinese Patent Office, both of which are incorporated herein by reference in its their entireties.

FIELD

The present disclosure relates to the field of performance test of an insulating material used for a high-voltage alternating-current cable, and in particular to a method for detecting a storage life of a pre-crosslinked material used for insulation of a high-voltage alternating-current cable.

BACKGROUND

A main insulating material of an insulating layer of a high-voltage alternating-current cable is crosslinked polyethylene. The most widely used method for crosslinking polyethylene is a chemical crosslinking method. In the chemical crosslinking method, free radicals are generated by thermal decomposition of a peroxide crosslinking agent, and are used to crosslink polyethylene having a linear structure into crosslinked polyethylene having a network structure. A material extruded in the crosslinking process is a pre-crosslinked material. The pre-crosslinked material is produced as follows. Antioxidant with a mass fraction of 0.2% is added to polyethylene at a temperature of 130° C. to 250° C. The mixture is uniformly mixed in a screw mixer, and then a crosslinking agent with a mass fraction of 2% is added to the mixture at a temperature of 110° C. to 120° C. The crosslinking agent is usually dicumyl peroxide (DCP). The uniformly mixed mixture is extruded by a screw extruder, granulated, and dehydrated by a vibrating screen to form a pre-crosslinked product.

The crosslinking agent DCP is a strong oxidizer. During storage of the pre-crosslinked granules before being used for cable manufacturing, an amount of DCP is spontaneously decomposed, resulting in a decreased content of DCP in the pre-crosslinked material. In the formal crosslinking extrusion of the pre-crosslinked material, DCP serves as an initiator of the crosslinking reaction, having a significant impact on the efficiency of the crosslinking reaction and the crosslinking density of the final product. Therefore, pre-crosslinked materials stored for different times have different activities due to different DCP contents, which directly affect the performance of the insulation layers of cable products.

Therefore, the activity and storage life of the pre-crosslinked material are very important to the performance of the insulation layer of the cable. However, in the art, there is neither a well proven method for detecting activity and a storage life of a pre-crosslinked material used for insulation of a high-voltage alternating-current cable, nor a method for determining an aging time and temperature used in an accelerated aging test on a pre-crosslinked material.

SUMMARY

A method for detecting a storage life of a pre-crosslinked material used for insulation of a high-voltage alternating-current cable is provided according to the embodiments of the present disclosure, to determine an aging time period and temperature used in an accelerated aging test performed on the pre-crosslinked material and detect the storage life of the pre-crosslinked material used for insulation of a high-voltage alternating-current cable.

A method for detecting a storage life of a pre-crosslinked material used for insulation of a high-voltage alternating-current cable is provided according to an embodiment of the present disclosure. The method includes:

performing tableting on the pre-crosslinked material to obtain reference crosslinked polyethylene, where the pre-crosslinked material is an unaged pre-crosslinked material;

measuring a crosslinking degree of the reference crosslinked polyethylene to obtain crosslinking degree reference data;

measuring a mechanical property of the reference crosslinked polyethylene to obtain mechanical property reference data;

heating the pre-crosslinked material at a predetermined temperature for a predetermined time period to obtain a fast-aged pre-crosslinked material;

performing tableting on the fast-aged pre-crosslinked material to obtain crosslinked polyethylene;

measuring the crosslinking degree of the crosslinked polyethylene made of the fast-aged pre-crosslinked material to obtain crosslinking degree detection data;

measuring the mechanical property of the crosslinked polyethylene made of the fast-aged pre-crosslinked material to obtain mechanical property detection data;

comparing the crosslinking degree reference data with the crosslinking degree detection data to obtain a first comparison result;

comparing the mechanical property reference data with the mechanical property detection data to obtain a second comparison result;

in a case that the first comparison result falls within a first allowable error range and the second comparison result falls within a second allowable error range, repeating the following steps until the first comparison result does not fall within the first allowable error range or the second comparison result does not fall within the second allowable error range:

increasing the predetermined time period of heating by a predetermined step length;

re-obtaining the crosslink degree detection data and the mechanical property detection data by retest;

comparing the re-obtained crosslink degree detection data with the crosslink degree reference data and comparing the re-obtained mechanical property detection data with the mechanical property reference data;

in a case that the first comparison result does not fall within the first allowable error range, or the second comparison result does not fall within the second allowable error range:

recording the predetermined time period of heating, and determining the fast-aged pre-crosslinked material is an expired pre-crosslinked material;

obtaining an equation for calculating a decomposition rate of a crosslinking agent in the pre-crosslinked material:

$$X = 1 - e^{-\frac{t \cdot \ln 2}{\tau}};$$

where $\tau$ represents a half-life period of the crosslinking agent at a temperature T, and t represents a time period that the crosslinking agent is stored at the temperature T; and obtaining the storage life of the pre-crosslinked material by calculating a result of subtracting the step length from the time period used for obtaining the expired pre-crosslinked material by heating, and converting the result into a time period of storage at the room temperature using the equation for calculating the decomposition rate and an equation of calculating the half-life period of the crosslinking agent according to temperature.

Furthermore, the method may further includes:

measuring a dielectric property of the reference crosslinked polyethylene to obtain dielectric property reference data;

measuring the dielectric property of the crosslinked polyethylene made of the expired pre-crosslinked material to obtain dielectric property detection data; and comparing the dielectric property reference data with the dielectric property detection data to determine deterioration of the expired pre-crosslinked material.

The crosslinking degree of the reference crosslinked polyethylene and the crosslinking degree of the crosslinked polyethylene made of the fast-aged pre-crosslinked material may be measured through a DSC test or a thermal extension test.

The mechanical property may include a tensile strength, an elastic modulus and an elongation at break. The dielectric property may include a direct current conductivity, an alternating current breakdown field strength, a relative dielectric constant and a dielectric loss tangent.

Compared with the conventional technology, the present disclosure has the following beneficial effects. The method for detecting a storage life of a pre-crosslinked material used for insulation of a high-voltage alternating-current cable is provided according to the embodiments of the present disclosure. Tableting is performed on an unaged pre-crosslinked material to obtain crosslinked polyethylene. A crosslinking degree, a mechanical property, and a dielectric property of the crosslinked polyethylene are measured to obtain measurement results as reference data. The pre-crosslinked material is heated to obtain a fast-aged pre-crosslinked material. The crosslinking degree, mechanical property, and dielectric property of crosslinked polyethylene obtained by performing tableting on the fast-aged pre-crosslinked material are measured to obtain measurement results. The measurement results are compared with the reference data. In a case that comparison results all fall within corresponding allowable error ranges, the time period of heating is increased by a predetermined step length, and the above measurement and comparison are repeated until the comparison results do not all fall within the corresponding allowable error ranges. According to the equation for calculating the decomposition rate of the crosslinking agent and the equation for calculating the half-life period according to temperature, a result obtained by subtracting the step length from the time period of heating is converted into a time period of storage at the room temperature, to obtain the storage life of the pre-crosslinked material. In the present disclosure, accelerated aging is performed by heating, which shortens the test time and reduces the material consumption. The measured crosslinking degree and mechanical property of the crosslinked polyethylene made of the fast-aged pre-crosslinked material are respectively compared with the crosslinking degree and the mechanical property of the reference crosslinked polyethylene. Based on the equation that the decomposition rate and the half-life period of the crosslinking agent in the pre-crosslinked material change with temperature, the storage life of the pre-crosslinked material can be determined according to the aging time and temperature used in the accelerated aging test performed on the pre-crosslinked material.

BRIEF DESCRIPTION OF THE DRAWINGS

FIG. 1 is a schematic flowchart of a method for detecting a storage life of a pre-crosslinked material used for insulation of a high-voltage alternating-current cable according to an embodiment of the present disclosure.

DETAILED DESCRIPTION OF EMBODIMENTS

Technical solutions of embodiments of the present disclosure are clearly and completely described below. Apparently, the embodiments described in the following are only some embodiments of the present disclosure, rather than all the embodiments. Any other embodiments obtained by those skilled in the art based on the embodiments in the present disclosure without any creative effort fall within the protection scope of the present disclosure.

In order to explain determination and calculation of parameters used in an accelerated aging test, the theory of calculation of a half-life period and a decomposition rate of the crosslinking agent DCP is briefly introduced here.

Researches show that crosslinking of polyethylene is a first-order reaction, and a kinetic equation of the reaction is expressed as:

$$v = -\frac{dC}{dt} = K \cdot C \tag{1}$$

In equation (1), v represents a reaction rate, C represents a concentration of DCP, and K represents a reaction rate constant.

C is solved according to equation (1) as:

$$C = C_0 \cdot e^{-K \cdot t} \tag{2}$$

In equation (2), $C_0$ represents an initial concentration of DCP in the pre-crosslinking material.

Therefore, according to the reaction kinetics theory, an equation for calculating the decomposition rate X of DCP in the pre-crosslinking material at an time t is obtained as:

$$X = \frac{C_0 - C}{C_0} = 1 - e^{-Kt} \tag{3}$$

Equation (3) shows that the decomposition rate of DCP increases with the storage time, which affects the activity of the pre-crosslinking material. An equation for calculating the reaction rate constant K is obtained according to the Arrhenius formula, which is expressed as:

$$K = A \cdot e^{-\frac{E}{RT}} \qquad (4)$$

In equation (4), R represents a gas constant, E represents apparent activation energy, and A represents a frequency factor. Therefore, a ratio of reaction rate constants at different temperatures is expressed as:

$$\frac{K_2}{K_1} = e^{\frac{E}{R}\left(\frac{1}{T_1} - \frac{1}{T_2}\right)} \qquad (5)$$

The decomposition half-life period $\tau$ of DCP is defined as a time period required for decreasing the concentration of DCP to the half of the initial concentration at an ambient temperature. According to the equation for calculating the decomposition rate of DCP, $\tau$ is solved as:

$$\tau = \frac{\ln 2}{K} \qquad (6)$$

Equation (6) is substituted into the equation (3) for calculating the decomposition rate to obtain:

$$X = 1 - e^{-\frac{t \cdot \ln 2}{\tau}} \qquad (7)$$

Based on the equation (6) representing the relationship between the decomposition half-life period $\tau$ of DCP and the reaction rate constant K, the equation (5) for calculating the ratio of reaction rate constants, and a half-life period of DCP measured at a certain temperature, a half-life period of DCP in the pre-crosslinking material at another temperature is calculated as:

$$\tau = \tau_0 \cdot e^{\frac{E}{R}\left(\frac{1}{T} - \frac{1}{T_0}\right)} \qquad (8)$$

In equation (8), $\tau_0$ represents a half-life period of DCP at a known temperature $T_0$.

According to the existing experimental data and conclusions, it can be calculated that the decomposition half-life period of DCP at a room temperature (30° C.) is 490 years, and the half-life period at other temperatures can also be calculated. Some calculation results are shown in Table 1 below.

TABLE 1

Decomposition half-live periods of DCP in the pre-crosslinking material at different temperatures

| Temperature ° C. | Half-life period |
|---|---|
| 30 | 490 years |
| 40 | 72 years |
| 50 | 12 years |
| 60 | 784 days |
| 70 | 157 days |
| 80 | 35 days |
| 90 | 8.3 days |

TABLE 1-continued

Decomposition half-live periods of DCP in the pre-crosslinking material at different temperatures

| Temperature ° C. | Half-life period |
|---|---|
| 100 | 51.6 hours |
| 110 | 14.3 hours |
| 120 | 4.2 hours |
| 130 | 80 minutes |
| 140 | 26.6 minutes |
| 150 | 9.3 minutes |
| 160 | 3.4 minutes |
| 170 | 1.32 minutes |
| 180 | 31.8 seconds |
| 190 | 13.3 seconds |
| 200 | 5.75 seconds |
| 210 | 2.58 seconds |
| 220 | 1.19 seconds |
| 230 | 0.571 seconds |

With the data in Table 1 and the equation (7) for calculating the decomposition rate of DCP, the content of DCP in the pre-crosslinked material stored at the room temperature for a certain time period can be calculated. In an accelerated aging test on the pre-crosslinked material, in order to achieve the same decomposition rate of DCP to have the same effect as that obtained when the pre-crosslinked material is stored at the room temperature for a time period, both the stability of the mixture of the pre-crosslinked material and the reasonable time period of the aging test should be considered.

It should be noted that, the increasing of the storage temperature can not only accelerate the spontaneous decomposition of DCP to accelerate the aging of the pre-crosslinked material, but also affect the polyethylene molecules in the pre-crosslinked material. Due to the increasing number of active free radicals in the mixture of the pre-crosslinked material, a little polyethylene molecules are crosslinked spontaneously, which affects a subsequent test result. A temperature used in the accelerated aging test is usually set to be less than the temperature (about 180° C.) used in the actual crosslinking process, so that the crosslinking of polyethylene during aging can be ignored. Moreover, from the perspective of chemical reaction principle, as the crosslinking reaction is an exothermic reaction, with the increased temperature, a reaction balance moves to the left, and the crosslinking reaction is suppressed to some extent, reducing the proportion of the crosslinked outcomes in the pre-crosslinked material. Therefore, it can be determined that the activity of the pre-crosslinked material in the accelerated aging test is mainly affected by the spontaneous decomposition of DCP rather than the spontaneous crosslinking of the polyethylene molecules.

Based on the above conclusions, the temperature 70° C. is used in the accelerated aging test. At this temperature, it can be seen from Table 1 that the decomposition half-life period of DCP is 157 days. According to equation (7), it is calculated that an effect of storage at 30° C. for half a year can be equivalently achieved by accelerated aging for 3.8 hours, and an effect of storage at a room temperature for ten years can be equivalently achieved by accelerated aging for 77 hours (about three days). The temperature 70° C. is far less than the temperature used in the crosslinking process, which takes into account both the stability of the pre-crosslinked material and the reasonable time period of the test.

Referring to FIG. 1, which is a schematic flowchart of a method for detecting a storage life of a pre-crosslinked material used for insulation of a high-voltage alternating-current cable according to an embodiment of the present disclosure, the method includes the following steps S10 to S22.

In step S10, tableting is performed on a pre-crosslinked material to obtain reference crosslinked polyethylene. The pre-crosslinked material is an unaged pre-crosslinked material.

In step S11, a crosslinking degree of the reference crosslinked polyethylene is measured to obtain crosslinking degree reference data.

In step S12, mechanical properties of the reference crosslinked polyethylene is measured to obtain mechanical property reference data.

For example, steps S10 to S12 may be performed as follows. The unaged pre-crosslinked material is crosslinked at a temperature of 180° C., and is mold into a thin sheet with a thickness of 0.2 mm and a thin sheet with a thickness of 1.0 mm by a plate curing machine. The thin sheet with the thickness of 0.2 mm is cut into a round sample by a cutter and the thin sheet with the thickness of 1.0 mm is cut into a dumbbell shaped sample by the cutter. The round sample with the thickness of 0.2 mm is used for measuring a dielectric property, and the dumbbell shaped sample with the thickness of 1.0 mm is used for measuring a thermal elongation property and a mechanical property. The crosslinking degree of the crosslinked polyethylene sample made of the unaged pre-crosslinked material is obtained by a method defined in GB/T 36965-2018 for measuring a crosslinking degree based on a DSC test. The measurement result is taken as a reference for subsequent evaluation of the activity and life of the pre-crosslinked material.

In step S13, the pre-crosslinked material is heated at a predetermined temperature for a predetermined time period to obtain a fast-aged pre-crosslinked material.

In step S14, tableting is performed on the fast-aged pre-crosslinked material to obtain crosslinked polyethylene.

In step S15, a crosslinking degree of the crosslinked polyethylene made of the fast-aged pre-crosslinked material is measured to obtain crosslinking degree detection data.

In step S16, a mechanical property of the crosslinked polyethylene made of the fast-aged pre-crosslinked material is measured to obtain mechanical property detection data.

The crosslinking degree may be measured by a DSC test or a thermal extension test. The mechanical property may include a tensile strength, an elastic modulus and an elongation at break. The dielectric property may include a direct current conductivity, an alternating current breakdown field strength, a relative dielectric constant and a dielectric loss tangent.

For example, steps S13 to S16 may be performed as follows. An accelerated aging test is performed on the unaged pre-crosslinked material. The unaged pre-crosslinked material is put in a beaker, and the beaker is placed in a constant-temperature oven with a temperature of 70° C. The accelerated aging is performed for 3.8 hours, which is equivalent to storing for half a year at 30° C. After the accelerated aging, the aged pre-crosslinked material is obtained. The aged pre-crosslinked material is placed to stand still at a room temperature for 24 hours. Then, tableting is performed, and the crosslinking degree and the mechanical property are measured.

In step S17, the crosslinking degree reference data is compared with the crosslinking degree detection data to obtain a first comparison result.

In step S18, the mechanical property reference data is compared with the mechanical property detection data to obtain a second comparison result.

In step S19, in a case that the first comparison result falls within a first allowable error range and the second comparison result falls within a second allowable error range, the predetermined time period of heating is increased by a predetermined step length to perform retest and obtain the crosslink degree detection data and the mechanical property detection data again. The obtained crosslink degree detection data is compared with the crosslink degree reference data, and the obtained mechanical property detection data is compared with the mechanical property reference data. The process is repeated until the first comparison result does not fall within the first allowable error range, or the second comparison result does not fall within the second allowable error range.

In step S20, in a case that the first comparison result does not fall within the first allowable error range, or the second comparison result does not fall within the second allowable error range, the predetermined time period of heating is recorded, and the fast-aged pre-crosslinked material is determined as an expired pre-crosslinked material.

For example, steps S19 and S20 may be performed as follows. If performance measurement results of the aged pre-crosslinked material sample are substantially the same as performance measurement results of the unaged pre-crosslinked material sample, it indicates that the pre-crosslinked material still maintain good activity after being stored at the room temperature for half a year, and the storage life at the room temperature is more than half a year.

In order to obtain the storage life of the pre-crosslinked material at the room temperature, 3.8 hours of aging at 70° C. is taken as a step length, which is equivalent to storage at 30° C. for half a year. The aging time period used in the accelerated aging test is increased by the step length to obtain an equivalent pre-crosslinked material being aged with a longer storage time at the room temperature. After the aging test is performed using the increased aging time period, the tableting process and measuring of the crosslinking degree and the mechanical properties of the sample are performed. The above process is repeated until obtaining a sample having an obvious change in properties.

Further, the method may further include: measuring a dielectric property of the reference crosslinked polyethylene to obtain dielectric property reference data, measuring the dielectric property of the crosslinked polyethylene made of the expired pre-crosslinked material to obtain dielectric property detection data, and comparing the dielectric property reference data with the dielectric property detection data to determine deterioration of the expired pre-crosslinked material.

In step S21, an equation for calculating a decomposition rate of a crosslinking agent in the pre-crosslinked material is obtained:

$$X = 1 - e^{-\frac{t \ln 2}{\tau}};$$

where $\tau$ represents a half-life period of the crosslinking agent at a temperature T, and t represents a time period that the crosslinking agent is stored at the temperature T.

In step S22, the storage life of the pre-crosslinked material is obtained by calculating a result of subtracting the step length from the time period used for obtaining the expired pre-crosslinked material by heating, and converting the result into a time period of storage at the room temperature using the equation for calculating the decomposition rate and an equation of calculating the half-life period of the crosslinking agent according to temperature.

For example, step S22 may be performed as follows. The step length used for increasing the aging time period is subtracted from the time period used in the accelerated aging test that obtains the material having the obvious change in the crosslinking degree and the mechanical property to obtain a storage time period at 70° C., and this storage time period at 70° C. is converted into a storage time period at 30° C. to obtain the storage life of the pre-crosslinked material at 30° C.

The method for detecting a storage life of a pre-crosslinked material used for insulation of a high-voltage alternating-current cable is provided according to the embodiments of the present disclosure. Tableting is performed on an unaged pre-crosslinked material to obtain crosslinked polyethylene. A crosslinking degree, a mechanical property, and a dielectric property of the crosslinked polyethylene are measured to obtain measurement results as reference data. The pre-crosslinked material is heated to obtain a fast-aged pre-crosslinked material. The crosslinking degree, mechanical property, and dielectric property of crosslinked polyethylene obtained by performing tableting on the fast-aged pre-crosslinked material are measured to obtain measurement results. The measurement results are compared with the reference data. In a case that comparison results all fall within corresponding allowable error ranges, the time period of heating is increased by a predetermined step length, and the above measurement and comparison are repeated until the comparison results do not all fall within the corresponding allowable error ranges. According to the equation for calculating the decomposition rate of the crosslinking agent and the equation for calculating the half-life period according to temperature, a result obtained by subtracting the step length from the time period of heating is converted into a time period of storage at the room temperature, to obtain the storage life of the pre-crosslinked material. In the present disclosure, accelerated aging is performed by heating, which shortens the test time and reduces the material consumption. The measured crosslinking degree and mechanical property of the crosslinked polyethylene made of the fast-aged pre-crosslinked material are respectively compared with the crosslinking degree and the mechanical property of the reference crosslinked polyethylene. Based on the equation that the decomposition rate and the half-life period of the crosslinking agent in the pre-crosslinked material change with temperature, the storage life of the pre-crosslinked material can be determined according to the aging time and temperature used in the accelerated aging test performed on the pre-crosslinked material.

Preferred embodiments of the present disclosure are described above. It should be noted that those skilled in the art can make several improvements and modifications without departing from the principle of the present disclosure. These improvements and modifications fall within the protection scope of the present disclosure.

The invention claimed is:

1. A method for detecting a storage life of a pre-crosslinked material used for insulation of a high-voltage alternating-current cable, comprising:

performing tableting on a piece of the pre-crosslinked material to obtain reference crosslinked polyethylene, wherein the pre-crosslinked material is an unaged pre-crosslinked material;

measuring a crosslinking degree of the reference crosslinked polyethylene to obtain crosslinking degree reference data;

measuring a mechanical property of the reference crosslinked polyethylene to obtain mechanical property reference data;

heating another piece of the pre-crosslinked material at a predetermined temperature for a predetermined time period to obtain a fast-aged pre-crosslinked material;

performing tableting on the fast-aged pre-crosslinked material to obtain crosslinked polyethylene;

measuring the crosslinking degree of the crosslinked polyethylene made of the fast-aged pre-crosslinked material to obtain crosslinking degree detection data;

measuring the mechanical property of the crosslinked polyethylene made of the fast-aged pre-crosslinked material to obtain mechanical property detection data;

comparing the crosslinking degree reference data with the crosslinking degree detection data to obtain a first comparison result;

comparing the mechanical property reference data with the mechanical property detection data to obtain a second comparison result;

in a case that the first comparison result falls within a first allowable error range and the second comparison result falls within a second allowable error range, repeating the following steps until the first comparison result does not fall within the first allowable error range or the second comparison result does not fall within the second allowable error range:

increasing the predetermined time period of heating by a predetermined step length;

re-obtaining the crosslink degree detection data and the mechanical property detection data by retest; and comparing the re-obtained crosslink degree detection data with the crosslink degree reference data and comparing the re-obtained mechanical property detection data with the mechanical property reference data; and in a case that the first comparison result does not fall within the first allowable error range, or the second comparison result does not fall within the second allowable error range:

recording the predetermined time period of heating, and determining the fast-aged pre-crosslinked material as an expired pre-crosslinked material;

obtaining an equation for calculating a decomposition rate of a crosslinking agent in the pre-crosslinked material:

$$X = 1 - e^{-\frac{t \cdot \ln 2}{\tau}};$$

wherein $\tau$ represents a half-life period of the crosslinking agent at a temperature T, and t represents a time period that the crosslinking agent is stored at the temperature T; and obtaining the storage life of the pre-crosslinked material by calculating a result of subtracting the step length from the time period used for obtaining the expired pre-crosslinked material by heating, and converting the result into a time period of storage at the room temperature using the equation for calculating the decomposition rate and an equation of calculating the half-life period of the crosslinking agent according to temperature.

2. The method for detecting a storage life of a pre-crosslinked material used for insulation of a high-voltage alternating-current cable according to claim 1, further comprising:
 measuring a dielectric property of the reference crosslinked polyethylene to obtain dielectric property reference data;
 measuring the dielectric property of the crosslinked polyethylene made of the expired pre-crosslinked material to obtain dielectric property detection data; and
 comparing the dielectric property reference data with the dielectric property detection data to determine deterioration of the expired pre-crosslinked material.

3. The method for detecting a storage life of a pre-crosslinked material used for insulation of a high-voltage alternating-current cable according to claim 1, wherein the measuring a crosslinking degree of the reference crosslinked polyethylene to obtain crosslinking degree reference data comprises:
 measuring the crosslinking degree of the reference crosslinked polyethylene through a DSC test or a thermal extension test, to obtain the crosslinking degree reference data.

4. The method for detecting a storage life of a pre-crosslinked material used for insulation of a high-voltage alternating-current cable according to claim 1, wherein the measuring the crosslinking degree of the crosslinked polyethylene made of the fast-aged pre-crosslinked material to obtain crosslinking degree detection data comprises:
 measuring the crosslinking degree of the crosslinked polyethylene made of the fast-aged pre-crosslinked material through a DSC test or a thermal extension test, to obtain the crosslinking degree detection data.

5. The method for detecting a storage life of a pre-crosslinked material used for insulation of a high-voltage alternating-current cable according to claim 1, wherein the mechanical property comprises a tensile strength, an elastic modulus and an elongation at break.

6. The method for detecting a storage life of a pre-crosslinked material used for insulation of a high-voltage alternating-current cable according to claim 1, wherein the dielectric property comprises a direct current conductivity, an alternating current breakdown field strength, a relative dielectric constant and a dielectric loss tangent.

* * * * *